United States Patent [19]

Uemura et al.

[11] Patent Number: 5,239,869
[45] Date of Patent: Aug. 31, 1993

[54] ACCELERATION DETECTOR

[75] Inventors: Fumito Uemura; Satoshi Komurasaki, both of Himeji, Japan

[73] Assignee: Mitsubishi Denki Kabushiki Kaisha, Tokyo, Japan

[21] Appl. No.: 692,343

[22] Filed: Apr. 26, 1991

[30] Foreign Application Priority Data

Apr. 27, 1990 [JP] Japan .................. 2-113644

[51] Int. Cl.$^5$ ............................................. H01L 41/08
[52] U.S. Cl. .................. 73/517 R; 310/329; 310/324; 310/348
[58] Field of Search ............... 73/35, 517 R; 310/329, 310/324, 348

[56] References Cited

U.S. PATENT DOCUMENTS

| | | | |
|---|---|---|---|
| 4,193,647 | 3/1980 | Guess et al. | 73/35 |
| 4,630,465 | 12/1986 | Hattou | 73/35 |
| 4,658,650 | 4/1987 | Yorinaga et al. | 73/35 |
| 4,704,894 | 11/1987 | Inuzuka et al. | 73/35 |
| 4,727,279 | 2/1988 | Peng | 73/35 |
| 5,053,671 | 10/1991 | Kobayashi et al. | 310/329 |
| 5,118,981 | 6/1992 | Kobayashi et al. | 310/329 |

FOREIGN PATENT DOCUMENTS 3817354 5/1988 Fed. Rep. of Germany .

Primary Examiner—Hezron E. Williams
Assistant Examiner—Michael Brock
Attorney, Agent, or Firm—Sughrue, Mion, Zinn, Macpeak and Seas

[57] ABSTRACT

An acceleration detector comprising a housing adapted to be rigidly secured to an object whose acceleration is to be detected and a transducer assembly disposed within the housing for detecting the acceleration of the housing. The transducer assembly comprises a disc-shaped diaphragm having a circular central region flexible in response to the acceleration of the housing. A disc-shaped piezoelectric element is attached to the central region of the diaphragm for generating a signal representative of the acceleration of the housing. Positioning means are disposed on the diaphragm and the piezoelectric element for positioning the piezoelectric element relative to the central region of the diaphragm. The positioning means may comprise a projection disposed on the diaphragm and engageable with the piezoelectric element. The projection may be disposed at the center of the diaphragm and the piezoelectric element may have a central hole engageable with the positioning projection. The projection may be disposed on the diaphragm and engageable with an outer peripheral edge of the piezoelectric element.

10 Claims, 7 Drawing Sheets

ACCELERATION DETECTOR

BACKGROUND OF THE INVENTION

This invention relates to an acceleration detector and, more particularly, to an acceleration detector for detecting knocking of an internal combustion engine.

A conventional acceleration detector for detecting knocking of an internal combustion engine comprises a housing adapted to be rigidly secured to an engine and an acceleration transducer assembly disposed within the housing for detecting the acceleration on the housing which represents knocking of the engine. The housing comprises a base and a cover securely connected together. The transducer assembly comprises a disc-shaped diaphragm and a piezoelectric element concentrically attached to the center of the diaphragm for sensing flexure thereof for generating a signal representative of the acceleration of the housing. The diaphragm is rigidly supported by the housing at its outer continuous circumference edge portion. Typically, the circumference edge portion is firmly clamped between edges of the base and the cover of the housing which are mechanically connected together by means of caulking.

The sensitivity of the acceleration transducer assembly comprising the diaphragm and the piezoelectric element is at its best at the resonance frequency $f_0$ which is determined by the diameter and the thickness of the diaphragm and the piezoelectric element, whereupon the output from the transducer assembly is at its maximum. The resonance frequency $f_0$ is an important characteristic of the acceleration detector and it is required that the deviation of the resonance frequency $f_0$ from one detector to another is minimized.

Another important factor of changing the resonance frequency $f_0$ of the acceleration transducer assembly is the accuracy of the concentric positioning of the piezoelectric element relative to the diaphragm. If the piezoelectric element is bonded to the diaphragm with their centers misaligned, the resonance frequency $f_0$ deviates from one detector to another.

With the conventional acceleration detector as described above, the disc-shaped piezoelectric element is simply bonded to the circular diaphragm, so that they are quite easily attached at an eccentric position, making the deviation of the resonance frequency $f_0$ large and frequent.

SUMMARY OF THE INVENTION

Accordingly, one object of the present invention is to provide an acceleration detector free from the above discussed problem of the conventional acceleration detector.

Another object of the present invention is to provide an acceleration detector in which accurate alignment of the diaphragm and the piezoelectric element can be easily achieved.

Another object of the present invention is to provide an acceleration detector in which accurate alignment of the diaphragm and the piezoelectric element can be easily achieved with a simple structure.

Still another object of the present invention is to provide a simple process for accurately positioning the piezoelectric element relative to the diaphragm.

With the above objects in view, the acceleration detector comprises a housing adapted to be rigidly secured to an object whose acceleration is to be detected such as an internal combustion engine and a transducer assembly disposed within the housing for detecting the acceleration of the housing. The transducer assembly comprises a substantially disc-shaped diaphragm having a substantially circular central region flexible in response to the acceleration of the housing. A substantially disc-shaped piezoelectric element is attached to the central region of the diaphragm for sensing flexure of the central region and generating a signal representative of the acceleration of the housing. The acceleration detector also comprises positioning means disposed on the diaphragm and the piezoelectric element for positioning the piezoelectric element relative to the central region of the diaphragm.

The positioning means may comprise a positioning projection disposed on the diaphragm and engageable with the piezoelectric element. The projection may be disposed at the center of the diaphragm and engageable with a central hole on the piezoelectric element, or may be disposed in a ring so as to be engageable with an outer peripheral edge of the piezoelectric element.

Alternatively, the positioning means may comprise inner surfaces of central holes in the diaphragm and the piezoelectric element, or an outer circumferential edge of the central region of the diaphragm and an outer edge of the piezoelectric element.

A process for positioning a piezoelectric element relative to a diaphragm of an acceleration detector also comprises the steps of inserting a positioning pin into the central hole of the diaphragm so that at least one end of the pin projects from the diaphragm, and placing the piezoelectric element on the diaphragm with the projected end of the pin inserted into the central hole of the piezoelectric element.

Alternatively, positioning pins may be placed around the outer edge of the central region of the diaphragm so that at least one end of the pins projects from the diaphragm, and the piezoelectric element is placed on the diaphragm with the outer edge of the piezoelectric element brought into contact with the projected ends of the positioning pins.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENTS

Figure 1:
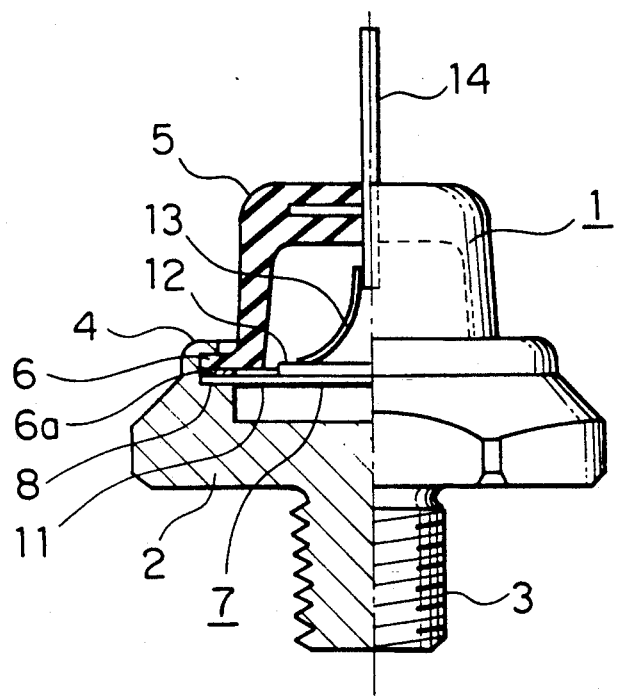
FIG. 1 is a partial sectional view of an acceleration detector of the present invention.

FIG. 1 illustrates an acceleration detector constructed in accordance with the present invention, which comprises a housing 1 having a metallic base 2 with a screw 3 and a flange 4 and a plastic cap 5 with a flange 6. The base 2 is adapted to be rigidly secured by the screw 3 to an object whose acceleration is to be detected, such as an internal combustion engine (not shown). The acceleration detector also comprises an acceleration transducer assembly 7 disposed within the housing 1 for detecting the acceleration of the internal combustion engine and therefore the housing 1. The transducer assembly 7 is placed on an annular planar surface defined by a step 8 on the base 2 inside of the flange 4. The cap 5 is firmly attached to the base 2 by caulking the flange 4 of the base 2 over the flange 6 of the cap 5 with the edge portion of the transducer assembly 7 firmly sandwiched between the cap flange 6 through a spring washer 6a and the step 8 of the base 2.

The transducer assembly 7 comprises a substantially disc-shaped metallic diaphragm 11 and a substantially disc-shaped piezoelectric element 12 attached to the diaphragm 11 for sensing the flexure of the diaphragm 11 and generating an electrical signal representative of the acceleration of the housing 1 attached to the engine. The signal from the piezoelectric element 12 is supplied through a lead 13 connected to the piezoelectric element 12 and an output terminal 14 insert-molded into the plastic cap 5.

Figure 2:
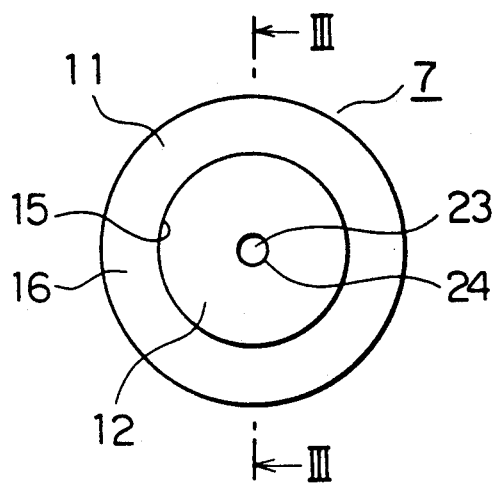
FIG. 2 is a plan view illustrating the acceleration transducer assembly of the present invention illustrated in FIG. 1.
Figure 3:
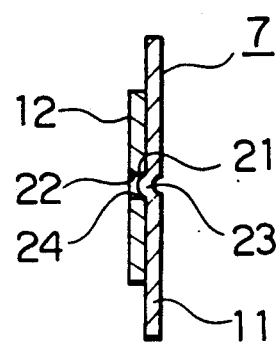
FIG. 3 is a sectional side view taken along line III—III of FIG. 2.

As best seen from FIGS. 2 and 3, the disc-shaped diaphragm 11 of the acceleration transducer assembly 7 comprises a substantially circular central region 15 flexible in response to the acceleration of the housing 1 and having the piezoelectric element 12 attached thereon. The diaphragm 11 also comprises an annular outer region 16 which is integrally disposed around the central region 15 and which is not attached to the piezoelectric element 12. As illustrated in FIG. 1, the outer region 16 of the diaphragm 11 is rigidly connected to the housing 1 by being clamped between the cap flange 4 through the spring washer 6a and the base step 8.

According to the present invention, the diaphragm 11 and the piezoelectric element 12 have positioning surfaces 21 and 22 for concentrically positioning the piezoelectric element 12 relative to the central region 15 of the diaphragm 11. In the embodiment illustrated in FIGS. 2 and 3, the positioning surface 21 on the diaphragm 11 is defined by an outer surface of a projection 23 formed at the center of the diaphragm 11. The positioning surface 22 on the piezoelectric element 12 is defined by an inner surface of a circular through hole 24 formed at the center of the element 12. The through hole 24 is sized so as to receive the projection 23 therein without any substantial play between the positioning surfaces 21 and 22.

During assembly of the acceleration transducer assembly 7, a bonding agent (not shown) is applied on at least one of the diaphragm 11 or the piezoelectric element 12, and the diaphragm 11 and the element 12 are put together with the projection 23 on the diaphragm 11 guided by and received in the through hole 24 of the piezoelectric element 12, whereby the element 12 is precisely concentrically positioned with respect to the diaphragm 11.

Figure 4:
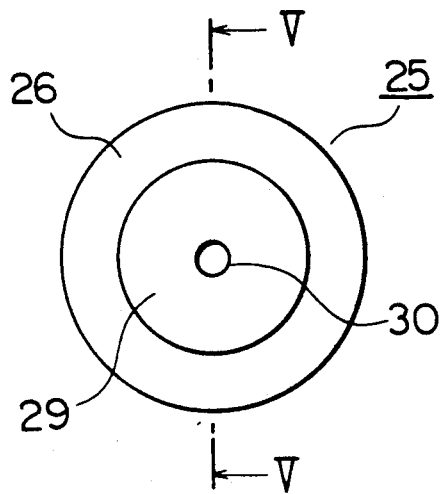
FIG. 4 is a plan view similar to FIG. 2 but illustrating another embodiment of the acceleration transducer assembly of the present invention.
Figure 5:
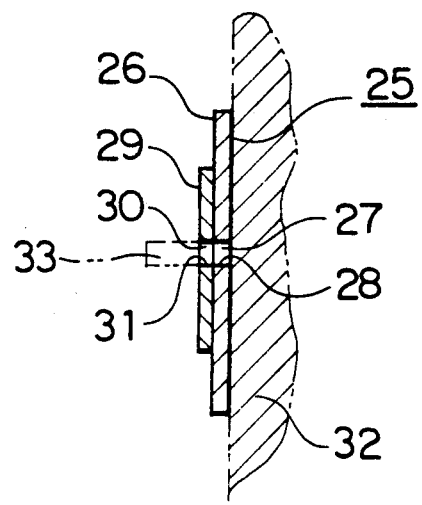
FIG. 5 is a sectional side view taken along line V—V of FIG. 4.

FIGS. 4 and 5 illustrate another embodiment of a transducer assembly 25 of the acceleration detector of the present invention, in which a diaphragm 26 has a central through hole 27 having an inner surface 28 defining a positioning surface, and a piezoelectric element 29 has a central through hole 30 having an inner surface 31 defining another positioning surface. These central holes 27 and 30 have equal diameters. During assembly, a jig 32 having a positioning pin 33 having a diameter slightly smaller than the diameter of the through holes 27 and 30 is used. The diaphragm 26 is placed on the jig 32 so that the positioning pin 33 is inserted into the central hole 27 of the diaphragm 26 and at least one end of the positioning pin 33 projects from the diaphragm 26. Then, the piezoelectric element 29 is also placed on the diaphragm 26 with the projected end of the positioning pin 33 inserted into the central through hole 30 of the piezoelectric element 29. Since the diaphragm 26 and the piezoelectric element 29 are guided by the common positioning pin 33 extending through the central through holes 27 and 30, they are precisely concentrically positioned relative to each other. The positioning pin 33 is withdrawn from the through holes 27 and 30 after the bonding agent (not shown) between the diaphragm 26 and the element 29 is cured.

Figure 6:
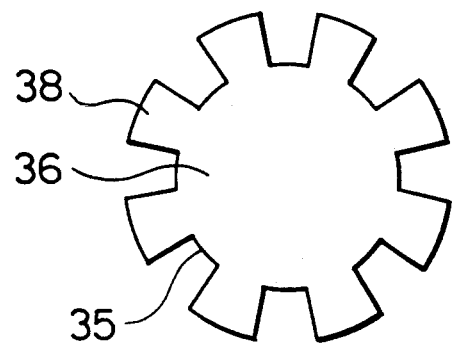
FIG. 6 is a plan view of another example of the diaphragm of the acceleration transducer of the present invention.
Figure 7:
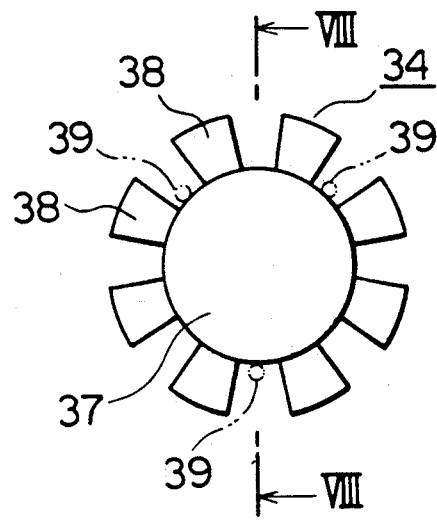
FIG. 7 is a plan view similar to FIG. 2 but illustrating another embodiment of the acceleration transducer assembly of the present invention.
Figure 8:
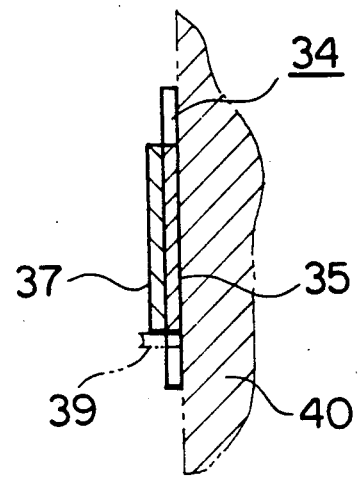
FIG. 8 is a sectional side view taken along line VIII—VIII of FIG. 7.

FIGS. 6 to 8 illustrate still another embodiment of a transducer assembly 34 for use in the acceleration detector of the present invention. The illustrated transducer assembly 34 comprises a gear-shaped diaphragm 35 having a substantially circular central region 36 on which the piezoelectric element 37 is attached and an outer region in the form of a plurality of radial arms 38 each having an outer end rigidly connected to the housing 1 by being clamped between the cap flange 4 through the spring washer 6a and the base step 8. The central region 36 has a diameter substantially equal to the diameter of the piezoelectric element 37 as illustrated in FIGS. 7 and 8. Therefore, the accurate concentric positioning of the piezoelectric element 37 on the central region 36 of the diaphragm 35 during bonding can be relatively easily achieved by employing positioning pins 39 (FIGS. 7 and 8) planted on a jig 40. In this embodiment, the positioning surfaces are an outer circumference of the circular central region 36 and the outer circumference of the piezoelectric element 37.

Figure 9:
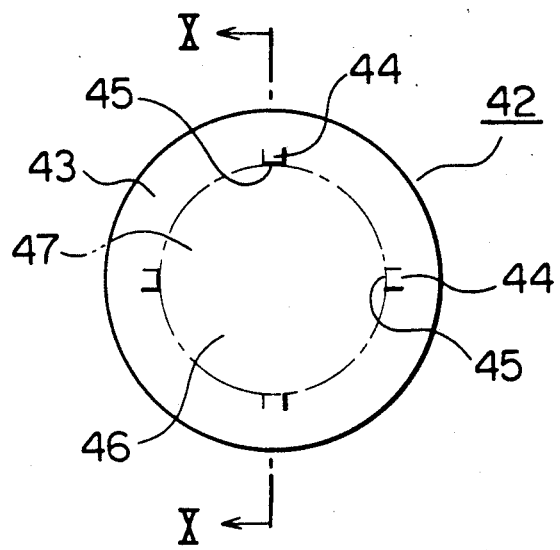
FIG. 9 is a plan view similar to FIG. 2 but illustrating another embodiment of the acceleration transducer assembly of the present invention.
Figure 10:
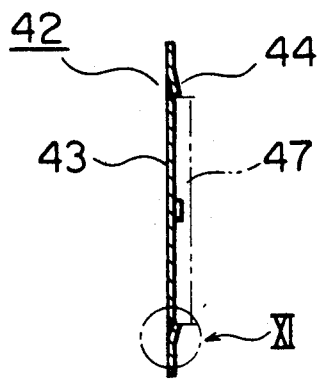
FIG. 10 is sectional side view taken along line X—X of FIG. 9.
Figure 11:
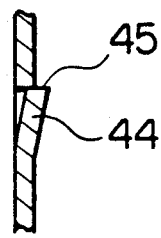
FIG. 11 is an enlarged view of the positioning projection of FIGS. 9 and 10.
Figure 12:
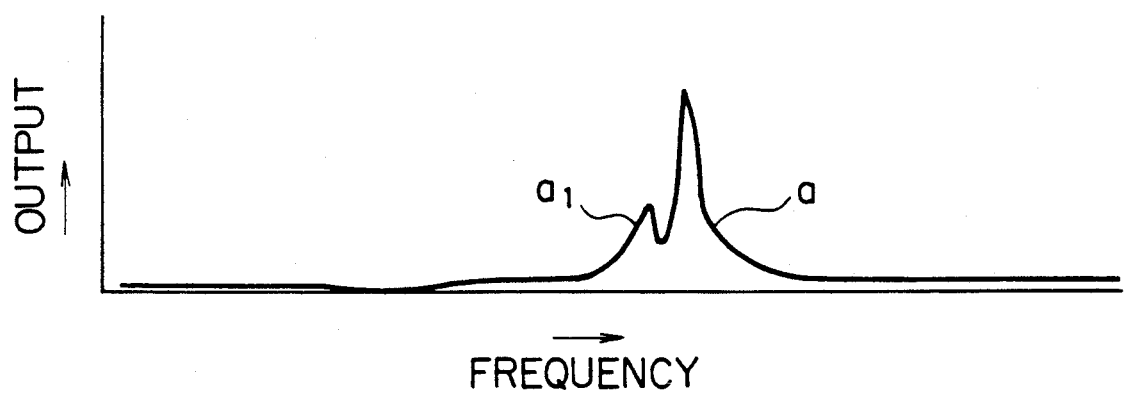
FIG. 12 is a graph illustrating the output characteristics with respect to frequency of the transducer assembly shown in FIGS. 9 to 11.
Figure 13:
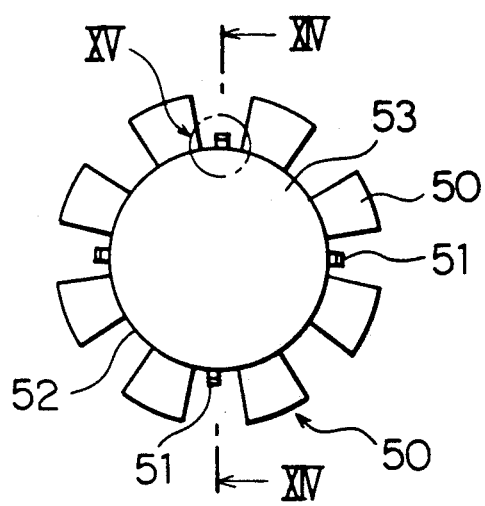
FIG. 13 is a plan view of the acceleration transducer assembly of another embodiment of the present invention.
Figure 14:
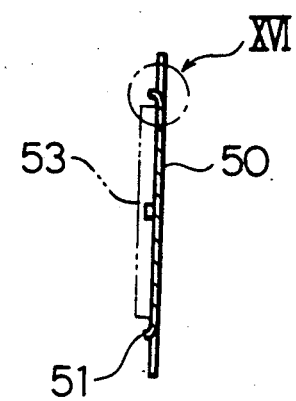
FIG. 14 is a sectional side view taken along line XIV—XIV of FIG. 13.
Figure 15:
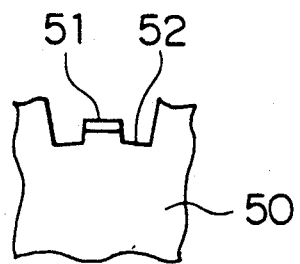
FIG. 15 is an enlarged plan view of the projection on the diaphragm illustrated in FIG. 13.
Figure 16:
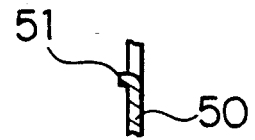
FIG. 16 is a sectional side view of the projection illustrated in FIG. 15.

FIGS. 9 to 11 illustrate another acceleration transducer assembly 42 which can be used in the acceleration detector of the present invention. In this embodiment, the transducer assembly 42 comprises a diaphragm 43 having four projections 44 having radially inner surfaces 45 disposed along an outer circumferential edge of a circular central region 46 of the diaphragm 43. When a piezoelectric element 47 is bonded to the diaphragm 43, an outer circumferential edge of the piezoelectric element 47 which serves as a positioning surface is guided and positioned by the inner surfaces 45 which serve as the positioning surfaces on the diaphragm 43. While this embodiment is effective for positioning the piezoelectric element 47 relative to the diaphragm 43, the frequency characteristics of the output from the transducer assembly 42 is illustrated by a curve a with a disturbance $a_1$ in FIG. 12, which depicts how the output from the transducer assembly 42 varies as the frequency changes.

Figure 17:
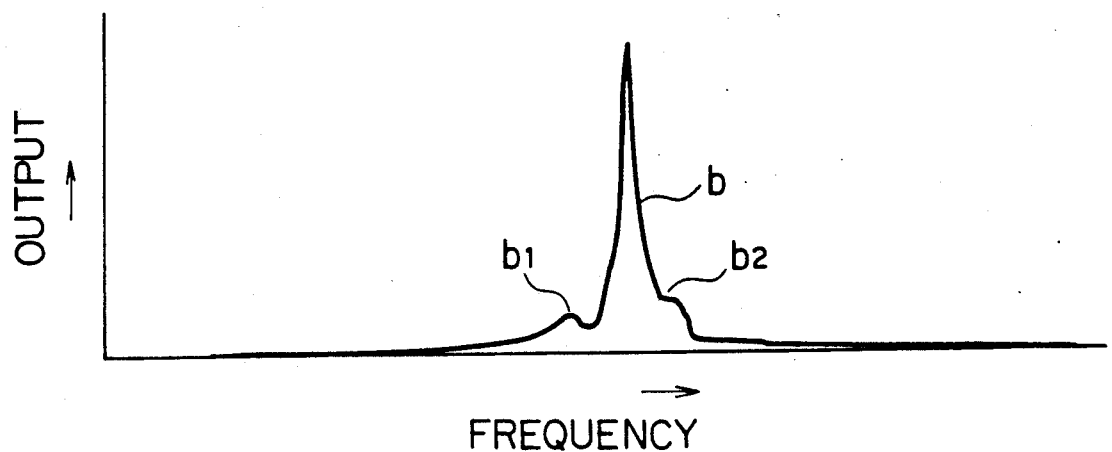
FIG. 17 is a graph illustrating the output characteristics with respect to frequency of the transducer assembly shown in FIGS. 13 to 16.

FIGS. 13 to 16 illustrate another embodiment in which a diaphragm 50 similar to the gear-shaped diaphragm 35 illustrated in FIGS. 6 to 8 has four positioning projections 51 at the outer circumference of the central region 52 of the diaphragm 50 or around the piezoelectric element 53. The positioning projections 51 are in the form of hooks extending from the outer edge of the central region 52 of the diaphragm 50 and substantially perpendicularly bent toward the side on which the piezoelectric element 53 is attached. The transducer of this embodiment exhibits a frequency characteristic of an output as illustrated by a curve b of FIG. 17 which has disturbances $b_1$ and $b_2$.

Figure 18:
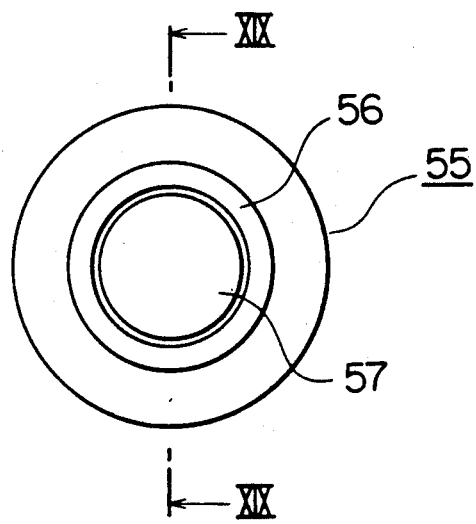
FIG. 18 is a plan view of the acceleration transducer of another embodiment of the present invention.
Figure 19:
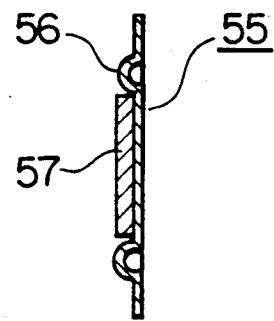
FIG. 19 is a sectional side view taken along line XIX—XIX of FIG. 18.

FIGS. 18 and 19 illustrate another acceleration transducer 55 in which the positioning projection comprises a single annular projection 56 disposed along an outer peripheral edge of a piezoelectric element 57. The output-frequency curve of this transducer 55 also has a disturbance.

As has been described, according to the present invention, the acceleration detector comprises positioning means disposed on the diaphragm and the piezoelectric element for positioning of the piezoelectric element relative to the central region of the diaphragm. The positioning means may comprise a positioning projection disposed on the diaphragm and engageable with the piezoelectric element. The projection may be disposed at the center of the diaphragm and engageable with a central hole on the piezoelectric element, or may be disposed in a ring so as to be engageable with an outer peripheral edge of the piezoelectric element. Alternatively, the positioning means may comprise inner surfaces of central holes in the diaphragm and the piezoelectric element, or an outer circumferential edge of the central region of the diaphragm and an outer edge of the piezoelectric element. Accordingly, with the acceleration detector of the present invention it is easy to accurately align the diaphragm and the piezoelectric element, and it has a simple structure.

What is claimed is:

1. An acceleration detector comprising a housing adapted to be rigidly secured to an object whose acceleration is to be detected and a transducer assembly disposed within said housing for detecting the acceleration of said housing, said transducer assembly comprising:
   a substantially disc-shaped diaphragm disposed within said housing and having a circular central region flexible in response to the acceleration of said housing, and an outer circumferential region surrounded by and rigidly clamped to said housing;
   a substantially disc-shaped piezoelectric element attached to said central region of said diaphragm for sensing flexure thereof and generating a signal representative of the acceleration of said housing; and
   positioning means defined by said diaphragm and said piezoelectric element for accurately concentrically positioning said piezoelectric element relative to said central region of said diaphragm.

2. An acceleration detector as claimed in claim 1, wherein said positioning means comprises a projection disposed on said diaphragm and engageable with said piezoelectric element.

3. An acceleration detector as claimed in claim 2, wherein said projection is disposed at the center of said diaphragm and said piezoelectric element has a central hole engageable with said positioning projection.

4. An acceleration detector as claimed in claim 1, wherein said positioning means comprises a projection disposed on said diaphragm and engageable with an outer peripheral edge of said piezoelectric element.

5. An acceleration detector as claimed in claim 4, wherein said positioning projection comprises a plurality of projections disposed along an outer peripheral edge of said piezoelectric element when assembled.

6. An acceleration detector as claimed in claim 4, wherein said positioning projection comprises a single annular projection disposed along an outer peripheral edge of said piezoelectric element when assembled.

7. An acceleration detector as claimed in claim 1, wherein said positioning means comprises an inner surface (28) of a central hole (27) disposed at the center of said diaphragm and an inner surface (31) of a central hole (30) disposed at the center of said piezoelectric element and having a diameter equal to the diameter of the central hole of the diaphragm.

8. An acceleration detector as claimed in claim 1, wherein said positioning means comprises an outer circumferential edge of said central region of said diaphragm and an outer circumferential edge of said piezoelectric element.

9. A process for accurately concentrically positioning a disc-shaped piezoelectric element relative to a flexible, disc-shaped diaphragm of an acceleration detector, comprising the steps of:
   inserting a positioning pin (33) through a central hole (27) of said diaphragm so that at least one end of said pin projects from said diaphragm; and
   placing said piezoelectric element on said diaphragm with the projected end of said pin inserted through a central hole (30) of said piezoelectric element having a diameter equal to the diameter of the central hole of the diaphragm,
   wherein said positioning pin has a diameter slightly smaller than the diameters of said central holes.

10. A process for accurately concentrically positioning a disc-shaped piezoelectric element relative to a flexible, disc shaped diaphragm of an acceleration detector, comprising the steps of:
   placing a plurality of positioning pins around an outer circumferential edge of a central region of said diaphragm so that at least one end of each pin projects from said diaphragm; and
   placing said piezoelectric element on said diaphragm with an outer circumferential edge of said piezoelectric element disposed in contact with inner sides of the projecting ends of said positioning pins.

* * * * *